United States Patent
Nakamura et al.

[11] Patent Number: 5,906,188
[45] Date of Patent: May 25, 1999

[54] ACCUMULATOR TYPE FUEL INJECTION CONTROL SYSTEM AND THE METHOD THEREOF

[75] Inventors: Sadao Nakamura, Ichikawa; Tadato Ihara, Kawasaki, both of Japan

[73] Assignee: Mitsubishi Jidosha Kogyo Kabushiki Kaisha, Tokyo, Japan

[21] Appl. No.: 08/932,959

[22] Filed: Sep. 18, 1997

[51] Int. Cl.⁶ .................................................. F02M 45/00
[52] U.S. Cl. ........................................... 123/464; 123/447
[58] Field of Search ................................... 123/447, 446, 123/464, 468, 381, 467, 497

[56] References Cited

U.S. PATENT DOCUMENTS

| | | | |
|---|---|---|---|
| 5,313,924 | 5/1994 | Regueiro | 123/456 |
| 5,476,080 | 12/1995 | Brunnhofer | 123/468 |
| 5,622,152 | 4/1997 | Ishida | 123/446 |

FOREIGN PATENT DOCUMENTS

| | | |
|---|---|---|
| 490709 A2 | 6/1992 | European Pat. Off. . |
| 693936 | 4/1994 | Japan . |

*Primary Examiner*—Carl S. Miller
*Assistant Examiner*—Arnold Castro

[57] ABSTRACT

In an accumulator type fuel injection control system, a fuel pressure setting means determines a basic fuel injection pressure from both fuel injection volume and engine speed, and when the temperature of a fuel discharged to a fuel tank is high, a fuel pressure correcting means subtracts, from the basic fuel injection pressure, a pressure reduction quantity which has been set according to the fuel temperature. Further, a fuel injection timing correcting means adds, to a basic fuel injection timing, an advance quantity which has been set according to the pressure reduction quantity and thereby determines a corrected fuel injection timing. A fuel pressure control means controls the fuel pressure in a fuel pump in accordance with the corrected fuel injection pressure, and a fuel pressure control means controls the injection timing of an accumulator type unit injector in accordance with the corrected fuel injection timing, whereby a rubber hose and the fuel tank both included in a fuel return system are prevented from being damaged by the fuel of high temperature which returns to the fuel return system.

8 Claims, 7 Drawing Sheets

ACCUMULATOR TYPE FUEL INJECTION CONTROL SYSTEM AND THE METHOD THEREOF

BACKGROUND OF THE INVENTION

The present invention relates to an accumulator type fuel injection system for controlling the injection of fuel with use of an accumulator type unit injector.

Generally, an accumulator type fuel injection control system is mounted in a fuel supply system of a diesel engine, and provided with an accumulator type unit injector in the fuel supply system, a fuel pressure pump, and a controller which functions as a control system.

In the accumulator type fuel injection control system for a diesel engine, therefore, a plunger is driven by an eccentric cam, which is driven in interlock with a crank shaft of the engine, and a fuel of a low pressure, which has been fed into a pump chamber by means of a feed pump, is pressurized to a high pressure and then fed to an accumulator. In accordance with an operating condition of the engine, a drive command is outputted from the controller to an electromagnetic actuator to open or close a spill valve, whereby the fuel pressure in the accumulator is controlled to a high level. On the other hand, a signal indicating the fuel pressure in the accumulator is fed back to the controller from a fuel pressure sensor.

The high-pressure fuel present in the accumulator is fed to a fuel reservoir through a feed hole of a fuel injection nozzle to urge a needle valve in its opening direction. When the fuel injection nozzle is not in operation, an electromagnetic actuator of a three-way solenoid valve is de-energized and the high-pressure fuel in the accumulator is fed to an oil chamber. A hydraulic piston applies a depressing force based on such hydraulic pressure to the needle valve, whereby the needle valve is held in its closed position.

When the electromagnetic actuator is energized in accordance with a drive command outputted from the controller, the oil chamber is connected to a fuel tank by means of the three-way solenoid valve and the fuel pressure exerted on the hydraulic piston is relieved, so that the needle valve is opened by virtue of a pressure spring, and the high-pressure fuel present in the fuel reservoir is injected into a cylinder through the nozzle hole.

In such an accumulator type fuel injection control system for a diesel engine, the amount of fuel to be injected is calculated and set in the controller on the basis of both engine speed and accelerator opening. Fuel injection pressure and fuel injection timing are determined on the basis of both engine speed and fuel injection volume. Therefore, the control system controls the electromagnetic actuator on the basis of both fuel injection pressure and fuel injection volume so that a required amount of fuel is injected at a required pressure.

For example, such an accumulator type fuel injection control system is disclosed in Japanese Patent Laid Open No.93936/94.

In the accumulator type fuel injection control system for a diesel engine as described above, the fuel tank is provided on the vehicle body side, while the fuel pressure pump and the injection nozzle, with fuel supplied thereto from the fuel tank, are provided on the engine side. Since the engine vibrates during operation, it is supported to limit rolling motion with respect to the vehicle body by means of a mount. Therefore, a hose on the engine side extending from the injection nozzle is connected to a pipe on the vehicle body side through a rubber hose, and this piping is extended up to the fuel tank. On the other hand, a pipe on the engine side extended from the fuel pressure pump through the feed pump is also connected to a pipe on the vehicle body side through a rubber hose, and this piping is extended up to the fuel tank.

In the injection nozzle, the electromagnetic actuator is energized in accordance with a drive command outputted from the controller, and by an operation of the three-way solenoid valve, the fuel in the oil chamber is discharged to the fuel tank through a pipe and a rubber hose or the like. The amount of fuel thus discharged into the fuel tank is almost equal to or larger than the amount of fuel injected and it is an amount of return. This fuel is in a condition of high temperature due to the heat generated when the fuel is pressurized by the fuel pressure pump after the high-pressure injection of fuel has been continued for a long time or due to the heat generated as a result of conversion from energy generated when the pressurized fuel is released to the atmospheric pressure through the injection nozzle which injects the fuel at a high pressure.

Consequently, a large amount of fuel held at a high temperature is discharged from the injection nozzle into the fuel tank through the pipe and rubber hose. There has so far been the likelihood of the rubber hose being damaged when the high-temperature fuel flows in a large amount through the rubber hose. There has also been the problem that the deterioration of the fuel tank which is made of resin and which holds the return fuel of high temperature therein, is accelerated.

The present invention solves the above-mentioned problems. It is an object of the invention to provide an accumulator type fuel injection control system and the method thereof wherein the temperature rise of fuel flowing to a fuel return system is suppressed to prevent damage of the members used in the fuel return system and improve the safety.

SUMMARY OF THE INVENTION

In order to achieve the above-mentioned object, the accumulator type fuel injection control system of the present invention is characterized by including an accumulator for accumulating the pressure of a fuel which is fed under pressure from a fuel pressure pump and for storing the fuel, a feed oil passage which provides communication between the accumulator and an injection fuel reservoir formed in a fuel injection valve, a control oil passage branched at one end thereof from the feed oil passage and communicating at the other end thereof with an oil chamber which is formed within the fuel injection valve and which is for controlling the opening and closing of a needle valve, a fuel injection control valve disposed in the control oil passage, the fuel injection control valve exerting the pressure of the fuel on the oil chamber to close the needle valve disposed within the fuel injection valve and causing the fuel present in the oil chamber to be discharged to a fuel return passage to open the needle valve, thereby allowing fuel injection to be performed, a fuel pressure setting means for setting the pressure of the fuel stored in the accumulator, a fuel temperature detecting means for detecting the temperature of the fuel present in the fuel return passage, and a fuel pressure correcting means which, on the basis of the fuel temperature detected by the fuel temperature detecting means, corrects the pressure of the fuel set by the fuel oil pressure setting means.

Therefore, the fuel stored in the accumulator is fed through the feed oil passage to the injection fuel reservoir in the fuel injection valve, and the fuel pressure is exerted on the needle valve on-off controlling oil chamber in the fuel injection valve from the control oil passage by means of the fuel injection control valve, thereby closing the needle valve disposed within the fuel injection valve, while the fuel present in the oil chamber is discharged to the fuel return passage, thereby opening the needle valve and allowing the fuel to be injected. At this time, the fuel temperature detecting means detects the temperature of the fuel present in the fuel return passage, and on the basis of the fuel temperature detected by the fuel temperature detecting means, the fuel pressure correcting means corrects the pressure of the fuel stored in the accumulator which pressure has been set by the fuel pressure setting means.

The accumulator type fuel injection control system of the present invention is further characterized in that the higher the fuel temperature detected by the fuel temperature detecting means, the lower the fuel pressure corrected by the fuel pressure correcting means.

Therefore, the temperature of the fuel present in the fuel return passage drops.

The accumulator type fuel injection control system of the present invention is further characterized in that the fuel injection control valve is controlled by a fuel injection timing control means, and that when the fuel pressure correcting means corrects the fuel pressure to a low side, the fuel injection timing control means controls the fuel injection valve on the basis of a control value obtained by correcting the fuel injection start timing to an advance side which correction is made by a fuel injection timing correcting means.

Therefore, the temperature of the fuel in the fuel return passage drops and the drop of the engine output caused by a pressure drop of the fuel in the accumulator is prevented.

The accumulator type fuel injection control system of the present invention is further characterized in that the control value for correcting the fuel injection start timing to an advance side by the fuel injection timing correcting means is determined on the basis of a map set in accordance with a correction pressure obtained by the fuel pressure correcting means.

Therefore, the control for correcting the fuel injection timing becomes easy.

The accumulator type fuel injection control system of the present invention is further characterized in that the correction of the fuel pressure made by the fuel pressure correcting means is limited to the correction in both high rotation region and high output torque region of the engine.

Therefore, the pressure of the fuel stored in the accumulator is reduced only when the temperature of the fuel in the fuel return passage becomes higher.

The accumulator type fuel injection control system of the present invention is further characterized in that a warning lamp is turned on when the correction of the fuel is performed by the fuel pressure correcting means.

Therefore, it is possible to inform the driver of the pressure correction being conducted for the fuel stored in the accumulator.

The accumulator type fuel injection control system of the present invention is further characterized in that the fuel return system includes a fuel tank for the storage of fuel is made of resin.

Therefore, resinous members included in the fuel return system such as the fuel tank for example is prevented from being damaged by the fuel of high temperature.

A method of accumulator type fuel injection control of the present invention is characterized in that an accumulator accumulates the pressure of a fuel which is fed under pressure from a fuel pressure pump and stores the fuel, then the fuel is fed through the feed oil passage to the injection fuel reservoir in the fuel injection valve, and the fuel pressure is exerted on the needle valve on-off controlling oil chamber in the fuel injection valve from the control oil passage by means of the fuel injection control valve for closing the needle valve disposed within the fuel injection valve, while the fuel present in the oil chamber is discharged to the fuel return passage, thereby opening the needle valve and allowing the fuel to be injected, simultaneously the fuel temperature detecting means detects the temperature of the fuel present in the fuel return passage, then based on the fuel temperature, the fuel pressure correcting means corrects the pressure of the fuel stored in the accumulator which pressure has been set by the fuel pressure setting means.

DETAILED DESCRIPTION OF THE PREFERRED EMBODIMENT

An accumulator type fuel injection control system embodying the present invention will be described in detail hereinunder with reference to the accompanying drawings.

First, the construction of an accumulator type fuel injection system usually employed for a diesel engine will be described with reference to FIG. 7.

Figure 7:
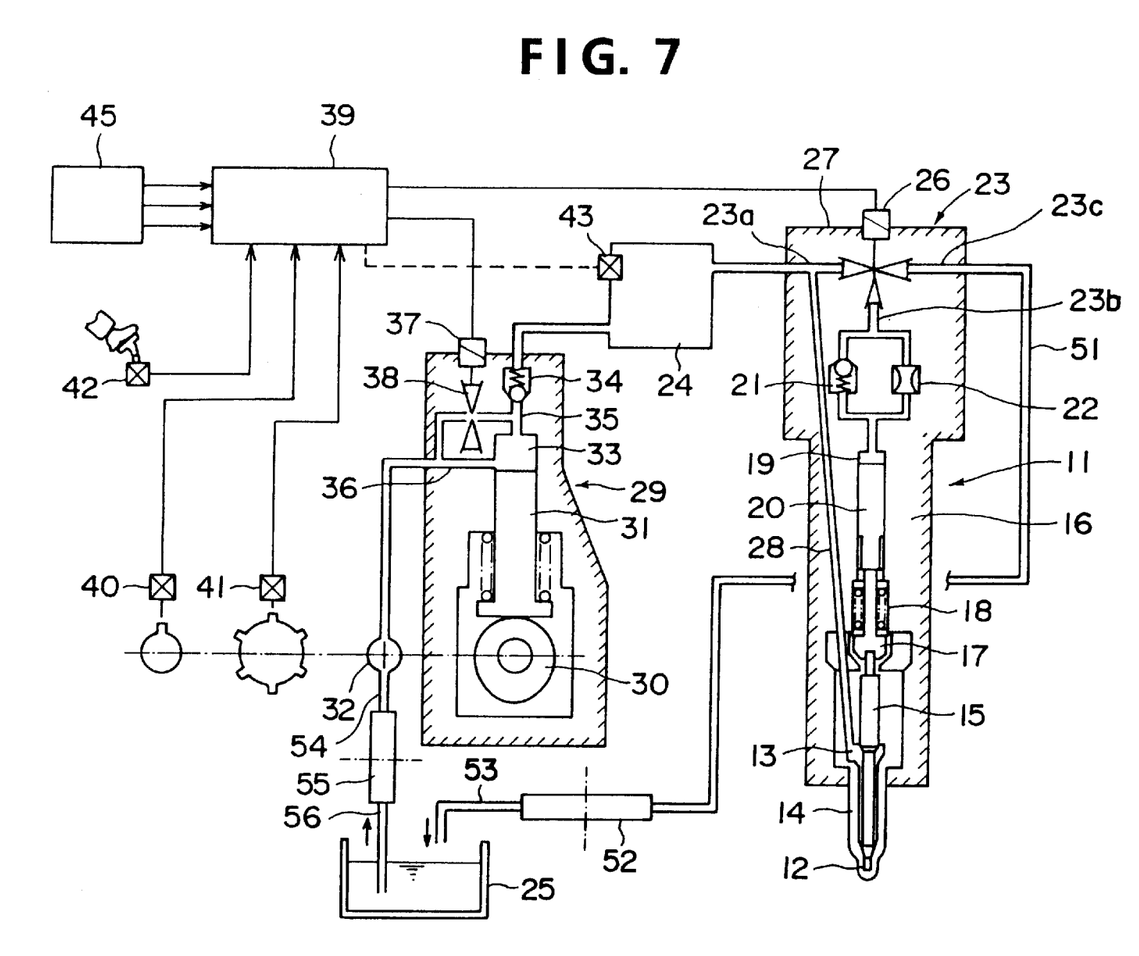
FIG. 7 is a schematic construction diagram of an accumulator type fuel injection system usually employed in a diesel engine.

In an accumulator type unit injector, as shown in FIG. 7, numeral 11 generally denotes a fuel injection nozzle. The injection nozzle 11 has a nozzle 14 with plural fuel injection nozzle holes 12 formed in its tip end and with a fuel reservoir 13 formed therein for the storage of fuel to be fed to the nozzle holes 12.

Within the nozzle 14 is received a nozzle needle 15 vertically slidably for controlling the communication between the nozzle holes 12 and the fuel reservoir 13. The nozzle needle 15 is urged in its closing direction at all times by means of a pressure spring 18 through a push rod 17 which is received within a nozzle holder 16. In the nozzle holder 16 is formed an oil chamber 19, and a hydraulic piston 20 is slidably fitted in the oil chamber 19 coaxially with the nozzle needle 15 and the push rod 17.

The oil chamber 19 formed within the nozzle holder 16 is connected to a first outlet 23b of a three-way solenoid valve 23 through a one-way valve 21 and an orifice 22 which are arranged side by side. The solenoid valve 23 is connected to an inlet 23a communicating with an accumulator 24 and also connected to a second outlet 23c communicating with a fuel tank 25. The first outlet 23b is selectively connectable to either the inlet 23a or the second outlet 23c through a valve member 27 which is driven by an electromagnetic actuator 26. With the actuator 26 is de-energized, the first outlet 23b communicates with the inlet 23a, while when the actuator 26 is energized, the first outlet 23b communicates with the second outlet 23c. Further, a feed hole 28 for connection between the fuel reservoir 13 and the accumulator 24 is formed in the nozzle holder 16 and the nozzle 14.

Fuel of a high pressure preset according to the operating condition of the engine is fed to the accumulator 24 by means of a fuel pressure pump indicated generally at 29. The fuel pressure pump 29 has an eccentric cam 30 which is driven in interlock with a crank shaft (not shown) of the engine and also has a plunger 31 which is reciprocated by the cam 30. The plunger 31 pressurizes the fuel in the fuel tank 25 to be fed into a pump chamber 33 by means of a low-pressure feed pump 32 and feeds the pressurized fuel to the accumulator 24 through a one-way valve 34.

Between a discharge-side passage 35 formed in the pump chamber 33 of the fuel pressure pump 29 and a suction-side passage 36 communicating with the feed pump 32 is disposed a spill valve 38 which is opened and closed with an electromagnetic actuator 37. The actuator 37 and the electromagnetic actuator 26 of the three-way solenoid valve 23 are controlled by a controller 39.

The controller 39 is connected to all of a cylinder discriminator 40 for discriminating cylinders of a multi-cylinder engine, an engine speed and crank angle sensor 41, an engine load sensor (accelerator opening sensor) 42, a fuel pressure sensor 43 for detecting the fuel pressure in the accumulator 24, a boost pressure sensor 44 for detecting an intake pressure fed to the engine by means of a turbocharger, and a detector 45 for detecting auxiliary information pieces such as atmospheric temperature, and pressure, and a fuel return temperature. In accordance with such various information pieces inputted the controller 39 can control the electromagnetic actuators 26 and 37.

An engine-side pipe 51 extends from the second outlet 23c of the three-way solenoid valve 23 in the injection nozzle 11 and connects to a vehicle body-side pipe 53 through a rubber hose 52. The pipe 53 extends up to the fuel tank 25. Further, an engine-side pipe 54 extends to the suction-side passage 36 in the supply pump 29 through the feed pump 32 and is connected to a vehicle body-side pipe 56 through a rubber hose 55. The pipe 56 extends up to the fuel tank 25.

The operation of the accumulator type unit injector will now be described briefly. First, the plunger 31 is driven by the eccentric cam 30 which is driven in interlock with the engine crank shaft, whereby the low-pressure fuel fed to the pump chamber 33 by the feed pump 32 is pressurized to a high pressure and is then fed to the accumulator 24.

In accordance with the operating condition of the engine based on various information pieces, a drive command is outputted from the controller 39 to the electromagnetic actuator 37 to open or close the spill valve 38, whereby the fuel pressure in the accumulator 24 is controlled beforehand to a high pressure (ex. 800 to 1,000 atm). On the other hand, a signal indicative of the fuel pressure in the accumulator 24 is fed back to the controller 39 from the fuel pressure sensor 43.

The high-pressure fuel in the accumulator 24 is fed to the fuel reservoir 13 through the feed hole 28 of the fuel injection nozzle 11 and urges the nozzle needle 15 upward, namely in its opening direction. On the other hand, when the fuel injection nozzle 11 is not in operation, the electromagnetic actuator 26 of the three-way solenoid valve 23 is de-energized and the inlet 23a and the first outlet 23b are in communication with each other. Consequently, the high-pressure fuel in the accumulator 24 passes through the one-way valve 21 and the orifice 22, and fed to the oil chamber 19.

The hydraulic piston 20 in the oil chamber 19 is urged downward by the fuel pressure in the oil chamber 19, and a valve closing force which is the sum of the depressing force based on such hydraulic pressure and the biasing force of the pressure spring 18 is applied to the nozzle needle 15 through the push rod 17. The area of receiving the fuel pressure acting downward on the hydraulic piston 20 is set sufficiently larger than the working area of the fuel pressure acting upward on the nozzle needle 15. Further, the downward spring force of the pressure spring 18 acts as an additional working force. Therefore, the nozzle needle 15 is held in its closed position illustrated.

Next, when the electromagnetic actuator 26 is energized in accordance with a drive command outputted from the controller 39, the inlet 23a and the first outlet 23b are disconnected from each other and the first outlet 23b and the second outlet 23c come into communication with each other. Consequently, the oil chamber 19 is connected to the fuel tank 25 through the orifice 22 and the second outlet 23c, the fuel pressure which has been acting on the hydraulic piston 20 is relieved, the pressure spring 18 is overcome by the fuel pressure acting upward on the nozzle needle 15, the nozzle needle 15 is opened, and the high-pressure fuel in the fuel reservoir 13 is injected into the cylinder through the nozzle holes 12.

Then, after the lapse of a time which has been preset according to the operating condition of the engine, the electromagnetic actuator 26 is de-energized by the controller 39, and the inlet 23a and the first outlet 23b of the three-way solenoid valve 23 again come into communication with each other, whereby the fuel pressure in the accumulator 24 is applied to the hydraulic piston 20, so that the nozzle needle 15 is closed to terminate the injection of fuel.

Figure 1:
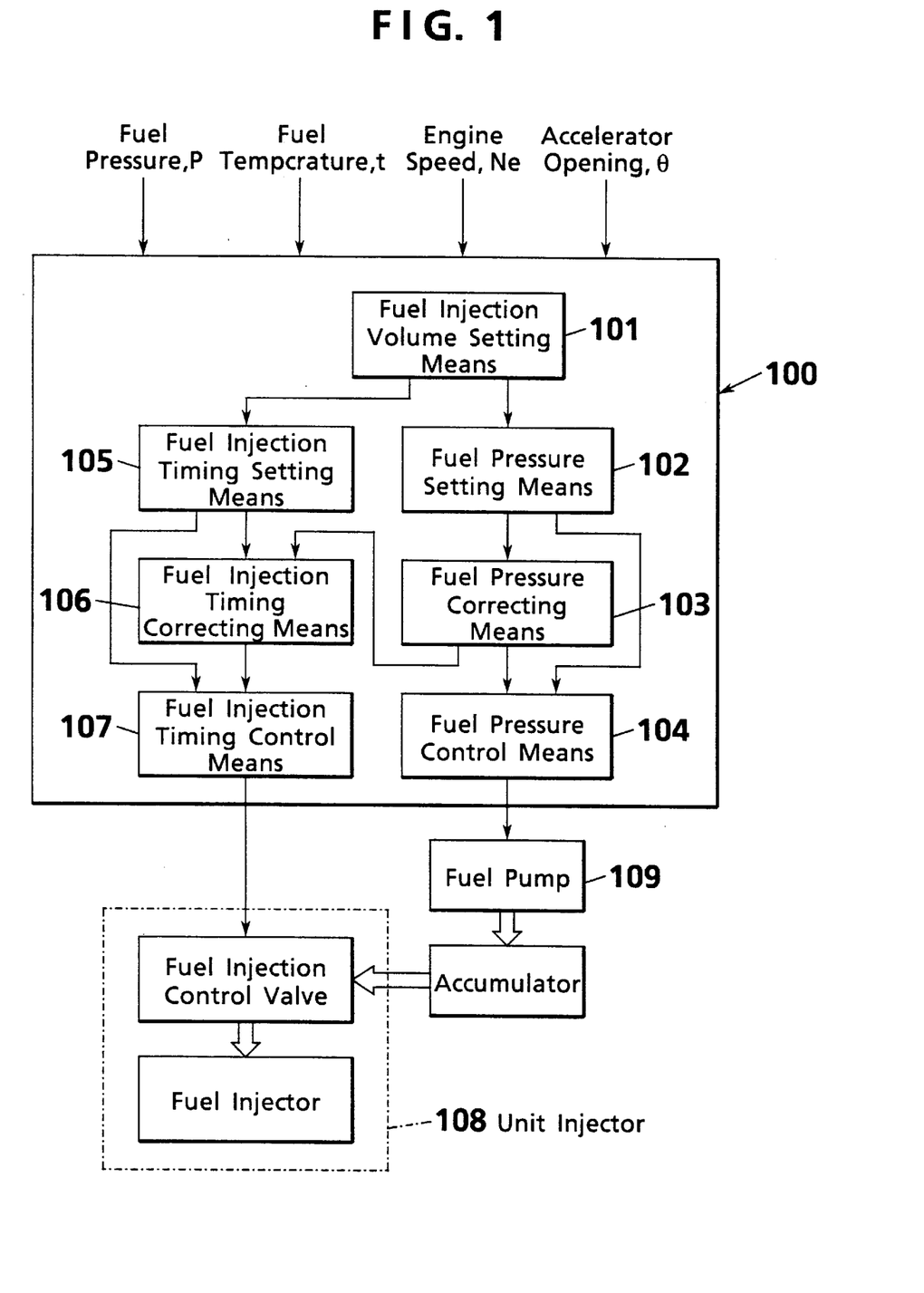
FIG. 1 is a control block diagram of an accumulator type fuel injection control system according to an embodiment of the present invention.

In the accumulator type fuel injection control system of this embodiment constructed as above, as shown in FIG. 1, a fuel injection control means 100 controls an accumulator type unit injector 108 in accordance with information pieces relating to the operating condition of the engine such as engine speed Ne, accelerator opening θ, fuel temperature t, and fuel pressure P. The fuel injection control means 100 includes a fuel injection volume setting means 101 which determines a fuel injection volume Q on the basis of both engine speed Ne and accelerator opening θ, a fuel pressure setting means 102 which determines a basic fuel injection pressure $P_B$ on the basis of both the engine speed Ne and the fuel injection volume Q, and a fuel pressure correcting means 103 which, when the temperature (return temperature) t of the fuel returning to the fuel tank is within a control range, corrects the basic fuel injection pressure $P_B$ which has been determined by the fuel pressure setting means 102 and determines a corrected fuel injection pressure $P_A$. A fuel pressure control means 104 controls a fuel pump 109 in accordance with the thus-determined basic fuel injection pressure $P_B$ or corrected fuel injection pressure $P_A$. The fuel injection control means 100 further includes a fuel injection timing setting means 105 which determines a basic fuel injection timing $T_B$ on the basis of both the engine speed Ne and the fuel injection volume Q, and a fuel injection timing correcting means 106 which, when the corrected fuel injection pressure $P_A$ has been set, corrects the basic fuel injection timing $T_B$ which has been determined by the fuel injection timing setting means 105 and determines a corrected fuel injection timing $T_A$. In accordance with the thus-determined basic fuel injection timing $T_B$ or the corrected fuel injection timing $T_A$, a fuel injection timing control means 107 controls a fuel injection control valve.

Figure 2:
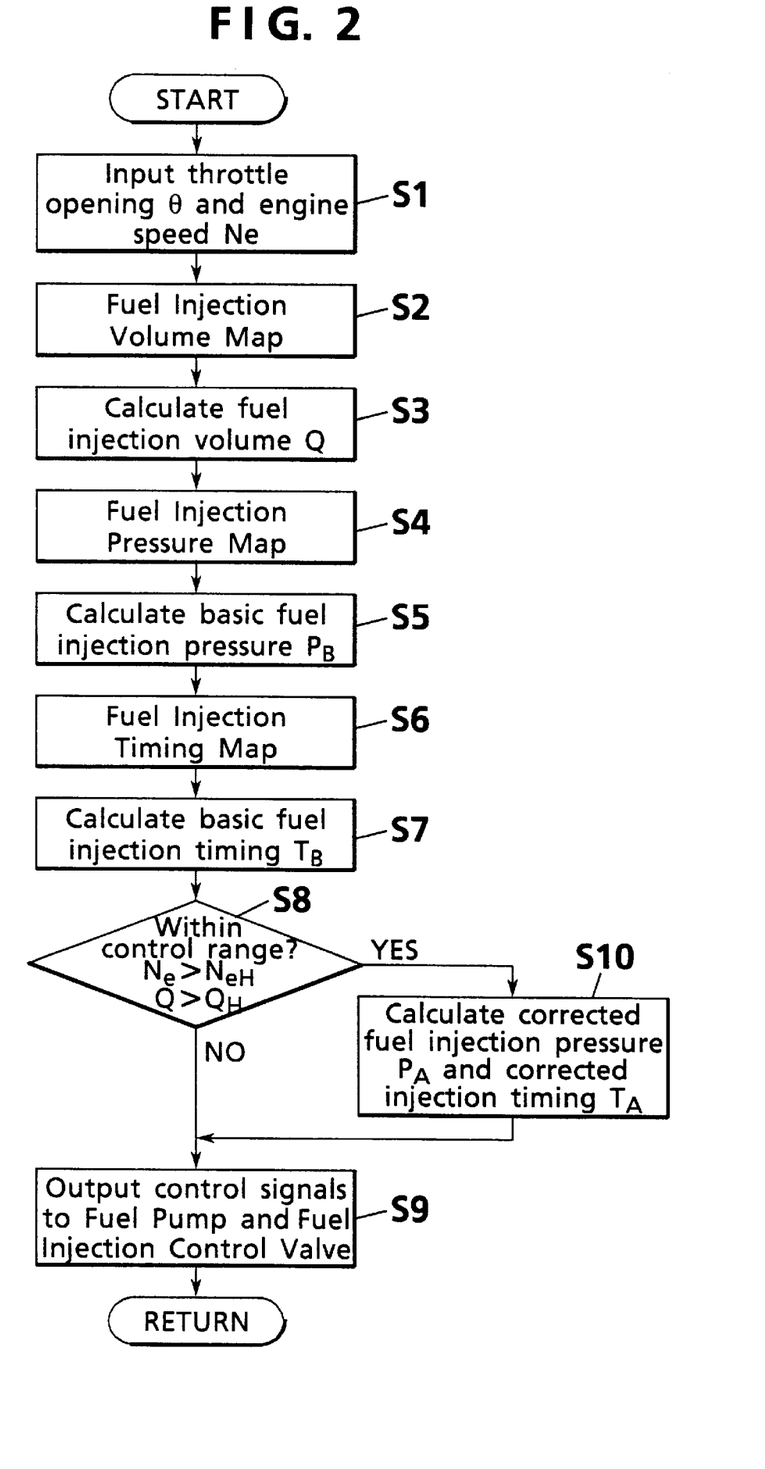
FIG. 2 is a control flowchart for the correction of fuel injection pressure and fuel injection timing in the accumulator type fuel injection control system.
Figure 3:
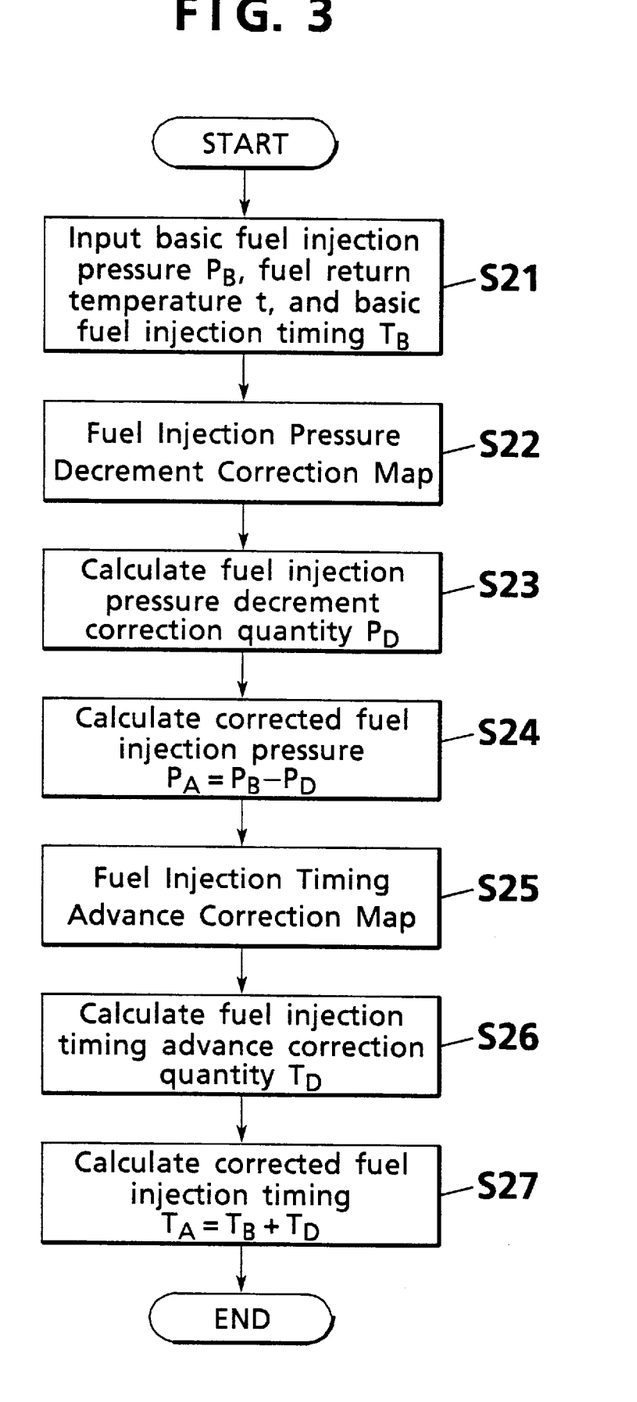
FIG. 3 is a control flowchart for controlling the fuel injection pressure and fuel injection timing in the accumulator type fuel injection control system.

With reference to the flowcharts of FIGS. 2 and 3, the following description is now provided as to how to determine the basic fuel injection pressure $P_B$ and corrected fuel injection pressure $P_A$, and how to determine the basic fuel injection timing $T_B$ and the corrected fuel injection timing $T_A$, by the fuel injection control means 100 in the accumulator type fuel injection control system of this embodiment described above.

Figure 4:
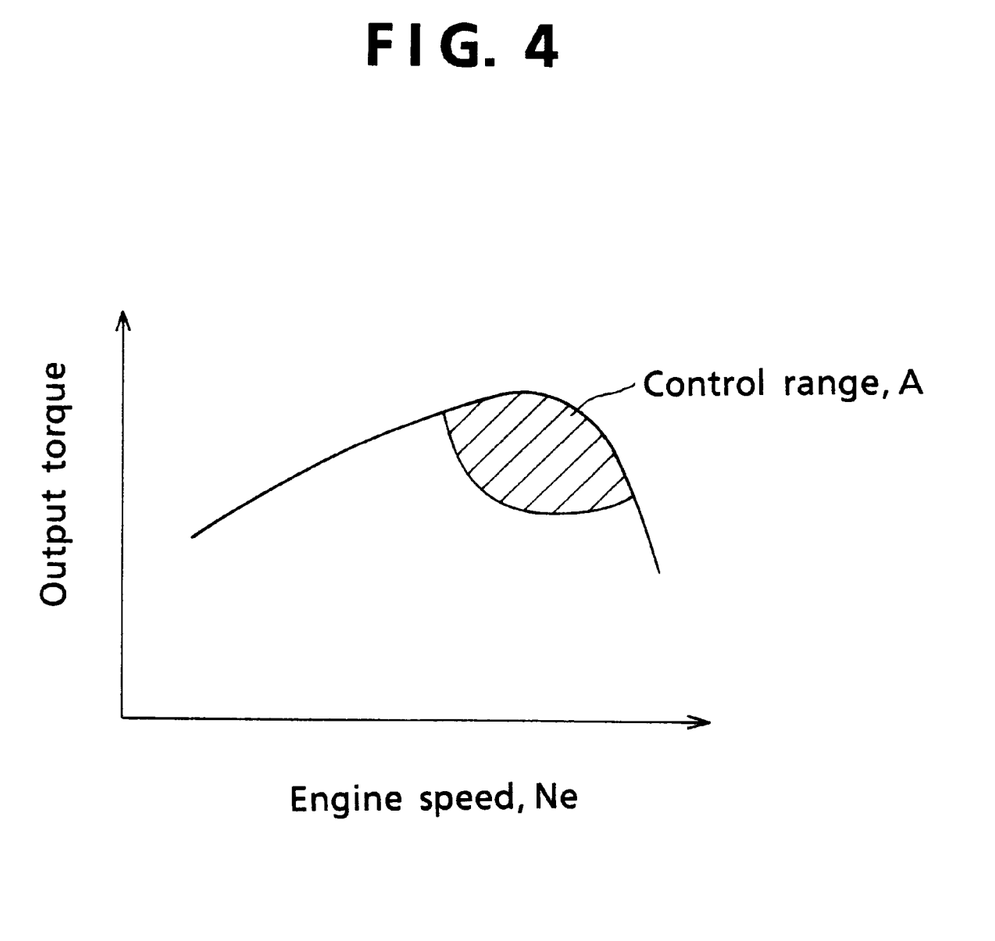
FIG. 4 is an explanatory diagram of a map which represents a control range.

As shown in FIG. 2, in step S1, both the throttle opening θ and engine speed Ne are inputted. In step S2, a fuel injection volume map is inputted, and in step S3, a fuel injection volume Q is calculated from both throttle opening θ and engine speed Ne. In step S4, a fuel injection pressure map is inputted, and in step S5, a basic fuel injection pressure $P_B$ is calculated from both engine speed Ne and fuel injection volume $P_B$. In step S6, a fuel injection timing map is inputted, and in step S7, a basic fuel injection timing $T_B$ is calculated from both engine speed Ne and fuel injection volume Q. Then, in step S8, it is judged whether the operating condition of the engine is within a control range involving a high fuel return temperature t and requiring correction of both the basic fuel injection pressure $P_B$ and the basic fuel injection timing $T_B$. To be more specific, as shown in the control range map of FIG. 4, it is judged whether the operating condition of the engine is within a control range A wherein the engine speed Ne is in a high revolution region higher than a high revolution $Ne_H$ and the fuel injection volume Q is larger than a high fuel injection volume $Q_H$. If the operating condition of the engine is within the control range A, the processing flow shifts to step S10, in which both the corrected fuel injection pressure $P_A$ and the corrected fuel injection timing $T_A$ are determined in accordance with the flowchart of FIG. 3.

On the other hand, if the engine operating condition is not within the control range A in step S8, the said processing is not performed, but in step S9 there is made a fuel injection control at the basic fuel injection pressure $P_B$ and the basic fuel injection timing $T_B$.

Figure 5:
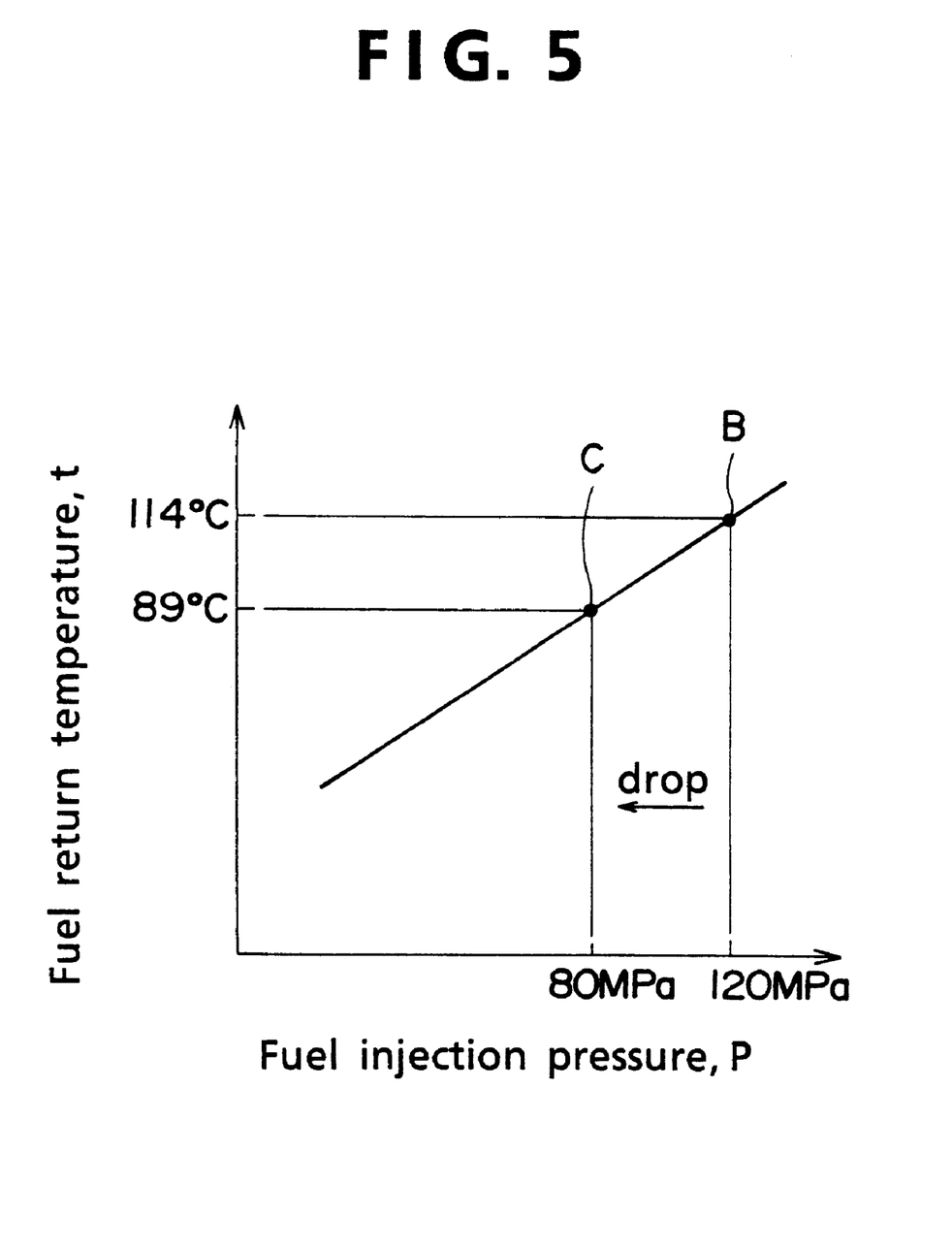
FIG. 5 is an explanatory diagram of a map which represents a pressure reducing correction for the fuel injection pressure.

On the other hand, in the processing for determining the corrected fuel injection pressure $P_A$ and the corrected fuel injection timing $T_A$, first in step S21, as shown in FIG. 3, the basic fuel injection pressure $P_B$, fuel return temperature t, and basic fuel injection timing $T_B$ are inputted. Then, in step S22, the fuel injection pressure reducing correction map of FIG. 5 is inputted, and in step S23, there is calculated a fuel injection pressure decrement correction quantity $P_D$. In step S24, the fuel injection pressure decrement quantity $P_D$ is subtracted from the basic fuel injection pressure $P_B$ to determine a corrected fuel injection pressure $P_A$. In this case, for example, at point B on the fuel injection pressure reducing correction map of FIG. 5, the fuel return temperature t at a basic fuel injection pressure $P_B$ of 120 MPa is 114° C., but if the basic fuel injection pressure $P_B$ is made into the corrected fuel injection pressure $P_A$, there is obtained a point C on the fuel injection pressure reducing correction map of FIG. 5, and the fuel return temperature t at a corrected fuel injection pressure $P_B$ of 80 MPa becomes 89° C.

Figure 6:
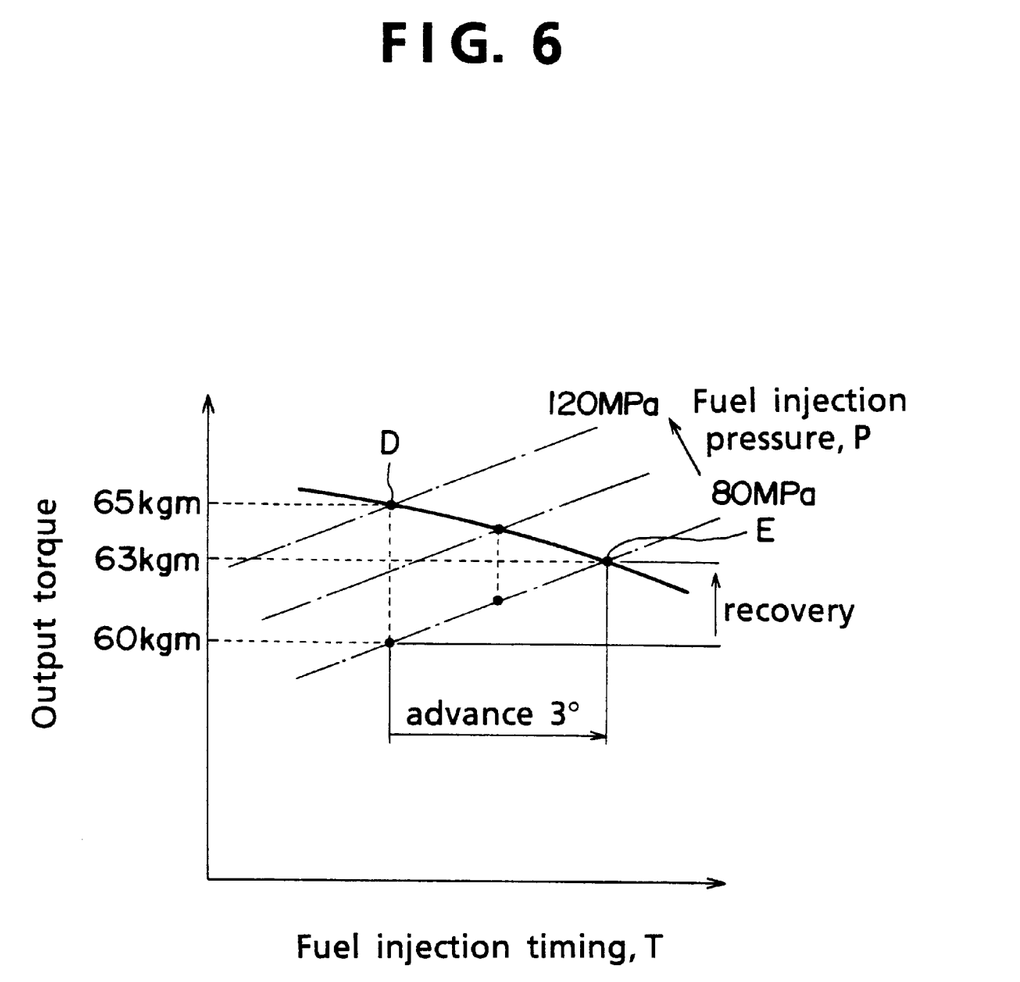
FIG. 6 is an explanatory diagram of a map which represents a timing advance correction for the fuel injection timing.

Next, in step S25, the fuel injection timing advance correction map of FIG. 6 is inputted, and in step S26, a fuel injection timing advance correction quantity $T_D$ is calculated. Then, in step S27, the fuel injection timing advance correction quantity $T_D$ is added to the basic fuel injection timing $T_B$ to determine a corrected fuel injection timing $T_A$. In this case, for example, at point D on the fuel injection timing advance map of FIG. 6, the basic fuel injection pressure $P_A$ is 120 MPa and the output torque is 65 kgm, but as mentioned above, since the basic fuel injection pressure $P_A$ was corrected to the corrected fuel injection pressure $P_B$ of 80 MPa, the output torque drops to 60 kgm. In this case, if the basic fuel injection timing $T_B$ is advanced 3°, there is obtained a point E on the fuel injection timing advance map of FIG. 5 and the output torque can be recovered up to 63 kgm.

When the engine operating condition is within the control range A and the processing for setting the corrected fuel injection pressure $P_A$ and the corrected fuel injection timing $T_A$ is performed, it is possible, by turning ON a warning lamp, to inform the driver of the situation that such a processing is performed because the fuel return temperature t is high. Upon lighting of the warning lamp, the driver can adjust the engine output by adjusting the accelerator.

As fully described in the above embodiment, according to the accumulator type fuel injection control system of the present invention, the fuel temperature detecting means detects the temperature of the fuel discharged to the fuel return passage from the needle valve on-off controlling oil chamber formed in the fuel injection valve, and on the basis of the fuel temperature detected by the fuel temperature detecting means, the fuel pressure correcting means corrects the pressure of the fuel stored in the accumulator which pressure has been determined by the fuel pressure setting means. Therefore, the fuel can be maintained at a predetermined temperature. For example, by suppressing the rise in temperature of the fuel flowing to the fuel return system, it is made possible to prevent damage of the members used in the fuel return system and thereby improve the safety.

According to the accumulator type fuel injection control system of the present invention, moreover, since the higher the fuel temperature detected by the fuel temperature detecting means, the lower the fuel pressure corrected by the fuel pressure correcting means, the temperature of the fuel present in the fuel return passage can be reduced to a predetermined level.

According to the accumulator type fuel injection control system of the present invention, moreover, the fuel injection control valve is controlled by the fuel injection timing control means, and when the fuel pressure correcting means corrects the fuel pressure to a low side, the fuel injection timing control means controls the fuel injection valve on the basis of a control value obtained by correcting the fuel injection start timing to an advance side which correction is made by the fuel injection timing correcting means. Consequently, the fuel temperature in the fuel return passage drops and it is possible to recover the engine output which has dropped with a drop in pressure of the fuel in the accumulator. Thus, it is possible to prevent deterioration of the engine performance.

According to the accumulator type fuel injection control system of the present invention, moreover, a control quantity for correcting the fuel injection start timing to an advance side, which correction is made by the fuel injection timing correcting means, is determined on the basis of a map which is formed in accordance with a corrected pressure obtained by the fuel pressure correcting means. Therefore, it is possible to effect the control easily.

Further, according to the accumulator type fuel injection control system of the present invention, since the correction of the fuel pressure made by the fuel pressure correcting means is limited to the correction in both high revolution region and high output torque region of the engine, the pressure of the fuel stored in the accumulator is dropped only when the fuel temperature in the fuel return passage becomes higher, whereby the deterioration of the engine performance can be prevented. Besides, since the high revolution region and high output torque region are set on the basis of a map, the control can be done easily.

Further, according to the accumulator type fuel injection control system of the present invention, a warning lamp goes on when the correction of the fuel pressure is conducted by the fuel pressure correcting means, whereby the driver can be informed of pressure correction for the fuel present in the accumulator. Thus, the driver can adjust the engine output in response to lighting of the warning lamp.

Further, according to the accumulator type fuel injection control system of the present invention, the fuel return system including the fuel holding tank is made of resin. Therefore, by correcting the pressure of the fuel stored in the accumulator and thereby reducing the temperature of the fuel present in the fuel return passage, it is made possible to prevent damage of resinous members in the fuel return system such as the fuel tank caused by the fuel of high temperature.

Still further, according to the accumulator type fuel injection control system of the present invention, an accumulator accumulates the pressure of a fuel which is fed under pressure from a fuel pressure pump and stores the fuel, then the fuel is fed through the feed oil passage to the injection fuel reservoir in the fuel injection valve, and the fuel pressure is exerted on the needle valve on-off controlling oil chamber in the fuel injection valve from the control oil passage by means of the fuel injection control valve for closing the needle valve disposed within the fuel injection valve, while the fuel present in the oil chamber is discharged to the fuel return passage, thereby opening the needle valve and allowing the fuel to be injected, simultaneously the fuel temperature detecting means detects the temperature of the fuel present in the fuel return passage, then based on the fuel temperature, the fuel pressure correcting means corrects the pressure of the fuel stored in the accumulator which pressure has been set by the fuel pressure setting means.

Therefore, the fuel can be maintained at a predetermined temperature. For example, by suppressing the rise in temperature of the fuel flowing to the fuel return system, it is made possible to prevent damage of the members used in the fuel return system and thereby improve the safety.

We claim:

1. An accumulator type fuel injection control system, comprising:
   an accumulator which stores fuel and accumulates fuel pressure generated by a fuel pressure pump;
   a feed passage which provides a path between said accumulator and an injection fuel reservoir provided in a fuel injection valve;
   a control passage, one end of which is connected to said feed passage and the other end of which communicates with a fuel chamber, said fuel chamber being provided within said fuel injection valve for controlling opening and closing of a needle valve;
   a fuel injection control valve disposed in said control passage, said fuel injection control valve selectively exerting the pressure of the fuel in said fuel chamber to close the needle valve disposed within said fuel injection valve, and causing the fuel in said fuel chamber to be discharged to a fuel return passage to open the needle valve, thereby allowing fuel injection to be performed;
   fuel pressure setting device which sets the pressure of the fuel stored in said accumulator;
   fuel temperature detecting device which detects the temperature of the fuel in said fuel return passage; and
   a fuel pressure correcting device which, on the basis of the fuel temperature detected by said fuel temperature detecting means, corrects the pressure of the fuel set by said fuel pressure setting means such that fuel pressure decreases with an increase in the return fuel temperature.

2. An accumulator type fuel injection control system according to claim 1, wherein said fuel injection control valve is controlled by a fuel injection timing control device, and when said fuel pressure correcting device corrects the pressure of the fuel to a lower pressure, said fuel injection timing control device controls said fuel injection valve in accordance with a control value obtained by correcting the fuel injection start timing to an advance side which correction is made by a fuel injection timing correcting device.

3. An accumulator type fuel injection control system according to claim 2, wherein a control quantity for correcting the fuel injection start timing to an advance side, performed by said fuel injection timing correction device, is determined on the basis of a map formed in accordance with the corrected pressured obtained by said fuel pressure correcting device.

4. An accumulator type fuel injection control system according to claim 1, wherein the correction of the fuel pressure by said fuel pressure correcting device is limited to the correction in both a high revolution region and a high output torque region of the engine.

5. An accumulator type fuel injection control system according to claim 1, wherein a warning is generated when said fuel pressure correction device corrects the fuel pressure.

6. An accumulator type fuel injection control system according to claim 1, wherein a fuel return system includes a fuel storage portion made of resin.

7. An accumulator type of fuel injection control system according to claim 5, wherein said warning is generated by turning on a lamp.

8. A method of controlling an accumulator type fuel injection system which operates by:
   accumulating the pressure of fuel which is fed under pressure from a fuel pressure pump and storing the fuel in an accumulator,
   feeding, through a feed passage, the fuel stored in the accumulator to an injection fuel reservoir in a fuel injection valve,
   exerting the fuel pressure on a needle valve on-off controlling fuel chamber in the fuel injection valve from a control passage by means of a fuel injection control valve, thereby closing the needle valve disposed within the fuel injection valve, while the fuel present in the fuel chamber is discharged to the fuel return passage, thereby opening the needle valve and allowing the fuel to be injected, said controlling method comprising the steps of:
   detecting the temperature of the fuel present in the fuel return passage by a fuel temperature detecting means; and correcting, by a fuel pressure correcting means, the pressure of the fuel stored in the accumulator, which pressure has been set by the fuel pressure setting means, such that the fuel pressure decreases with an increase in the return fuel temperature detected by said detecting step.

* * * * *